United States Patent Office 3,331,059
Patented July 11, 1967

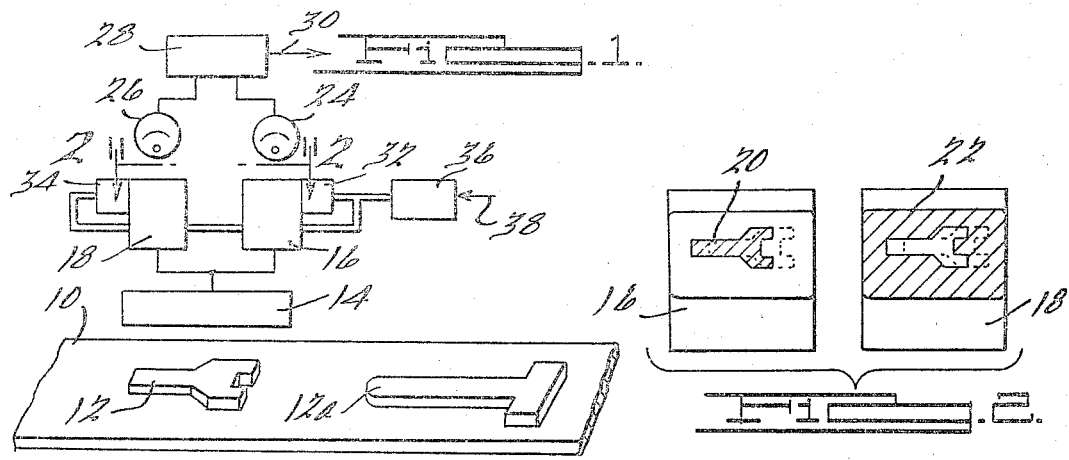
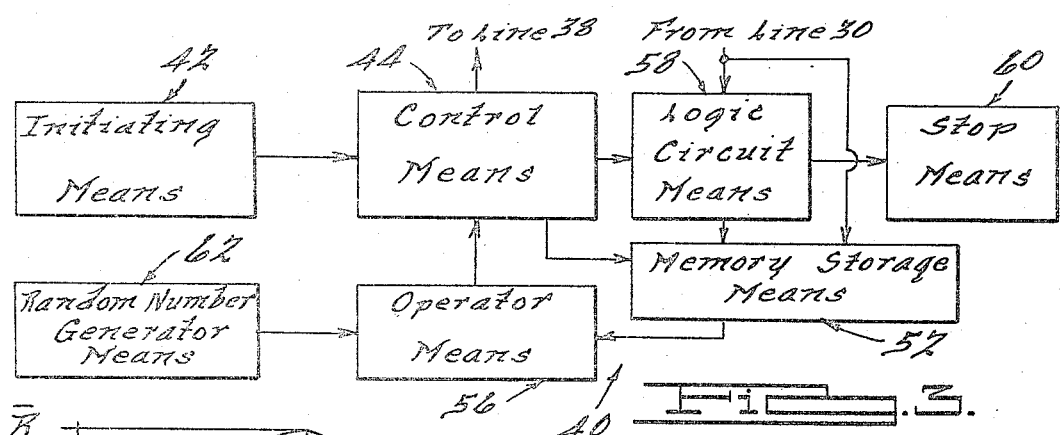
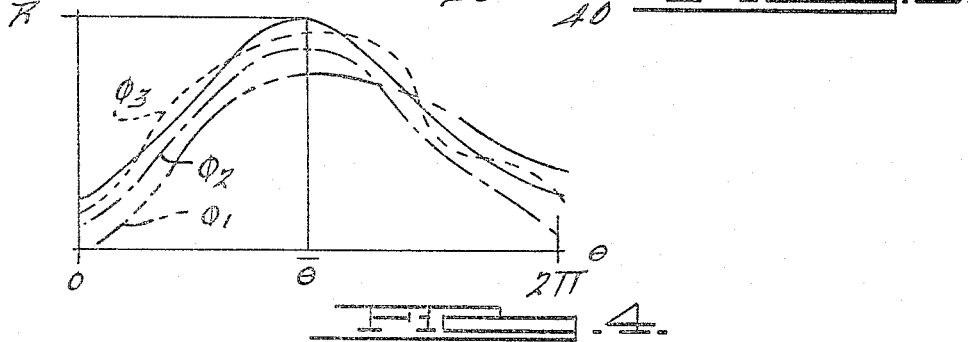
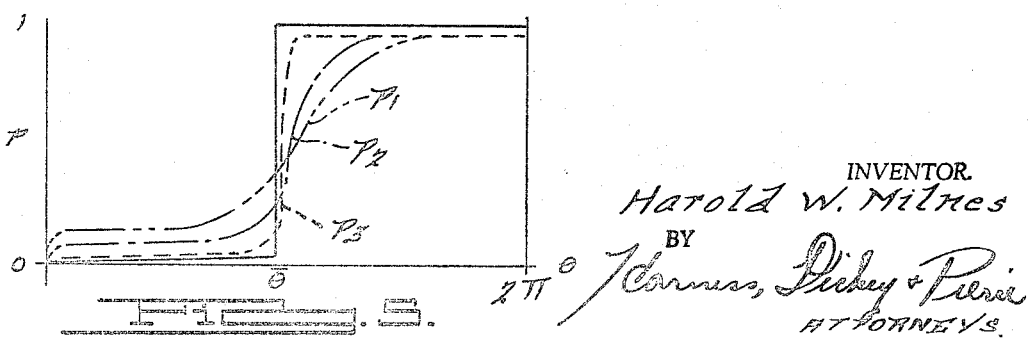
INVENTOR.
Harold W. Milnes

3,331,059
CONTROL SYSTEM
Harold Willis Milnes, 18310 Bretton Drive,
Detroit, Mich. 48223
Filed Dec. 31, 1964, Ser. No. 422,784
11 Claims. (Cl. 340—172.5)

The present invention relates to a self-adaptive control system.

In many applications it is desirous to be able to control a slave mechanism to perform a given function, such as to align two parts with each other for example. The slave mechanism is controlled by control signals from a master controller with a sensing unit feeding back to the master controller a response signal indicating the degree to which the slave mechanism has brought the two parts into the desired alignment. Thus for each control signal there will be a corresponding response signal. In the present invention the alignment of the two parts by the slave mechanism is accomplished by a series of trials with the new trial positions being selected by a random system. The control signals are selected in a random manner such that initially there is an equal probability of the selection of any particular control signal. However, the response signals from successive trials and their corresponding control signals are stored. The latter information is automatically analyzed relative to the desired end result and is used to weight the selection of the next trial such that the probability of selecting the proper control signal is generally increased after each selection.

The above system has the great advantage of being self corrective. For example, assume that the task to be performed by the slave mechanism is such that the response signal from the slave mechanism is a discontinuous function represented by a discontinuous response curve. The initial trials could weight the selection of the control signal such as to provide an increased probability of selections of control signals on the wrong portion of the response curve. However, the system will not be satisfied until a desired result has been attained; with new trials always being selected at random, even though the selection is weighted, eventually control signals will be obtained on the proper portion of the response curve; a new weighting will take place and eventually the desired result attained.

Therefore, it is an object of the present invention to provide a self-adaptive control system in which random control signals are emitted to control the behavior of a slave device to accomplish a desired result with the next random signal being selected in accordance with a weighted system on the basis of previous information received and recorded with the probability of selecting the proper control signal for accomplishing the desired result being generally increased with each new trial.

It is thus a general object of the present invention to provide a novel self-adaptive control system.

Other objects, features, and advantages of the present invention will become apparent from the subsequent description and the appended claims, taken in conjunction with the accompanying drawings, in which:

FIGURE 1 is a block diagram of a portion of the control system of the present invention;

FIGURE 2 is a view of a portion of the apparatus of FIGURE 1 taken along the line 2—2;

FIGURE 3 is a block diagram of a computer apparatus for use with the apparatus shown in FIGURE 1;

FIGURE 4 is a curve for a hypothetical situation and represents a plot of response signal versus control signal; and FIGURE 5 is a weighted distribution curve based upon the curve of FIGURE 4 and represents a plot of random numbers versus control signal.

While the system of the present invention is capable of a multitude of uses, it has been shown and described in conjunction with a pattern recognition system.

Looking now to the drawings, specifically to FIGURE 1, a conveyor 10 is provided to convey a plurality of different workpieces including workpieces such as 12, 12a, etc., to various work stations. At each work station can be located a pattern recognition system for determining whether or not the particular workpiece belongs at that station. In the drawing a recognition system for a single work station is shown and includes a television camera 14 which is located proximate to and above the conveyor 10 so as to pick up the picture of the workpieces as they are located momentarily under and in view of the camera 14. The output from the camera 14 is then fed to a pair of receiving sets 16 and 18, the faces of the receiving tubes of which are shown in FIGURE 2. On the face of the tube of the set 16 is a pattern formation 20 which is of a shape similar to the image of the workpiece as transmitted from the camera 14 onto the face of the tube. In a like manner a stencil or overlay 22 is provided on the face of the tube of the set 18 which stencil has a portion cut out having a shape similar to the image of the workpiece as transmitted from the camera 14 onto the face of the tube. For purposes of simplicity, it will be assumed that the workpiece 12 is located on the conveyor 10 to be in the proper vertical position relative to the camera tube 14 so that the image transmitted to the receivers 16 and 18 is in proper vertical position relative to the pattern 20 and the opening in the stencil 22. It is also assumed that the horizontal position of the workpiece 12 on conveyor 10 is such that the image transmitted onto the faces of the tubes of sets 16 and 18 is not necessarily in horizontal alignment with the pattern 20 and the opening in the stencil 22. The task to be accomplished by the system is to move the image on the faces of the tubes of sets 16 and 18 to various horizontal positions in an effort to match the image with both the pattern 20 and the cutout in the stencil 22. If this matching can be done it means that the workpiece being scanned belongs to that work station and can be removed. If proper matching cannot be done it means that the workpiece being scanned belongs to some other work station and the conveyor 10 will be actuated to carry that workpiece to the next station for scanning.

To detect the degree of matching between workpiece 12 and the pattern 20 and cutout stencil 22, a pair of photocells 24 and 26 are located relative to the faces of the tubes of sets 16 and 18, respectively, such as to detect the intensity of light emitted therefrom. In the case of the tube of set 16, the light emitted will be maximum when the image upon the face of the tube coincides with the pattern 20 and will be less than maximum as long as the image of the workpiece 12 is not in alignment with the pattern 20. In the case of the tube of set 18, the converse will occur and the light intensity will be greater than the minimum or a maximum when the image of the workpiece 12 is not in alignment with the opening and will be minimum when the image of the workpiece 12 upon the face of the tube of set 18 is directly in alignment with the cutout in the stencil 22. The photocells 24 and 26 can be appropriately connected to a circuit 28 which can be a bridge circuit, a bucking type circuit or some type of comparator circuit whereby the two outputs can be compared. As will be appreciated, the resultant output signal from circuit 28 can be provided to be either a maximum or a minimum value and is transmitted to a computer apparatus which is shown in FIGURE 3 by means of a transmission line generally indicated by the numeral 30.

The camera tube 14, the receiving sets 16 and 18, the photocells 24 and 26, and the circuit 28 can be of constructions well known to those skilled in the art and since the specific details thereof in no way comprise a part of the present invention, these specific details have been omitted for the purposes of clarity.

The receiving sets 16 and 18 are provided with control mechanisms 32 and 34, respectively, which are connected with the associated horizontal positioning circuitry of the receiving sets 16 and 18 whereby the horizontal position of the picture transmitted from the camera tube 14 can be changed along the faces of the tubes of the receiving sets 16 and 18. It is assumed for the purpose of discussion that the control mechanisms 32 and 34 include a potentiometer which is rotatable about 360° and that such rotation will move the image on the faces of the tubes of the receiving sets 16 and 18 horizontally from one end of the tubes to the other. Rotation of the potentiometers can be accomplished by a suitable motor and control circuit 36; the two potentiometers 32 and 34 are connected together such that they will be rotated together and hence to similar positions and hence the images on the receiving tubes 16 and 18 will be moved simultaneously to similar relative positions. The motor and control circuit 36 is a slave mechanism and is controlled by a control signal at its input 38 from the computer apparatus of FIGURE 3.

Looking now to FIGURE 3, a computer is depicted in block diagram form and is generally indicated by the numeral 40 and includes initiating means 42 which can be provided to be actuated either manually or automatically and which upon actuation clears information stored by the other stages of the computer and introduces the initially relevant variables for the first trial of the slave mechanism 36.

In the discussion that follows certain symbols are used, the definitions of some are given below:

$\theta$ the angular argument for the selected trials of the slave mechanism 36, $\theta^*$ the next trial value of $\theta$, $\theta_1, \theta_2, \ldots \theta_n$ the prior trial values of $\theta$ in chronological order according to order of numerical subscripts, $\bar{\theta}$ the value of $\theta$ providing the desired result, i.e., resulting in $\bar{R}$ (defined below), $R_n$ the response signal from the circuit 28 corresponding to a trial of the slave mechanism 36 at an angle $\theta_n$, $R^*$ the particular response signal corresponding to the trial for $\theta^*$, $\bar{R}$ the known maximum value of the response signal which occurs when the image of the proper workpiece is in proper alignment with the templates on the faces of the tubes of the receiving sets, $\phi_n(\theta)$ represents an approximation curve of the stored values of $\theta$ and corresponding values of R plotted in order of increasing angular argument $\theta$, $\psi[\phi_n(\theta)]$ represents an operator selected to operate on the approximation curve $\phi_n(\theta)$ to provide a weighted distribution curve $P_n(\theta)$, $P_n(\theta)$ is a weighted distribution curve being a plot of random numbers versus $\theta$, $p$ is a random number having a range of $0 < p \leq 1$, $n$ the $n$th trial of the system, $m$ a preselected number of trials of the system occurring chronologically, Initially an angular argument $\theta^*$ is selected either by a random system or by predetermination from initiating means 42. The selected $\theta^*$ is transmitted to control means 44 which translates the angular argument $\theta^*$ into an appropriate electrical control signal having a magnitude corresponding to the magnitude of $\theta^*$ and transmits the control signal to the slave 36 via line 38. The control signal causes rotation of the associated potentiometers to an angular position corresponding to $\theta^*$. At the same time the value of $\theta^*$ just utilized is fed into a memory storage means 52 which retains the value of $\theta^*$ for a purpose to be presently understood.

After the slave 36 has responded to the control signal for $\theta^*$, a response signal $R^*$ is transmitted from the circuit 28 into the memory storage means 52 via the line 30. At the same time the response signal $R^*$ is transmitted to logic circuit means 58 which compares the value of $R^*$ with the known desired value of $\bar{R}$, which represents the magnitude that the response signal should have when the proper positional relationship has been attained matching the image and the templates of receiving sets 16, 18. If the logic means 58 provides an affirmative answer then an output signal is provided which is transmitted to stop means 60 which stops the operation of the computer apparatus 40 and causes the actuation of suitable apparatus (not shown) to remove the workpiece 12 from the conveyor 10 and initiate movement of the conveyor belt 10 for the analysis of the succeeding workpiece. If the answer from the logic means 58 is negative, then the operations are permitted to continue.

In the memory means 52, the information is stored in chronological order; the memory means 52 is constructed to store only a fixed number $m$ of value $\theta^*$ and $R^*$ and hence upon receipt of the $m+1$ values of $\theta^*$ and $R^*$, being $\theta_{m+1}$ and $R_{m+1}$, the memory means 52 will erase the first values, i.e. $\theta_1$ and $R_1$ and upon receipt of the $M+2$ values of $\theta^*$ and $R^*$, being $\theta_{m+2}$ and $R_{m+2}$, will erase the second values, i.e. $\theta_2$ and $R_2$ and so on. This operation of the memory means 52 serves an important function to be presently understood.

At the same time the information in the memory means 52 is reoriented in an order according to increasing angular arguments; that is, beginning with the smallest value of $\theta$ stored to the largest and maintaining in similar sequence the associated values of R. The information as stored and maintained in the memory means 52 is operated upon to provide a curve $\phi_n(\theta)$ which is an approximation to the true behavior of the slave mechanism based upon the stored, reoriented information, in accordance with a preselected means for obtaining such an approximating curve. The latter means of forming the approximating curve used could be a step function, a parabolic function, a sinusoidal function, etc. The selection of the function to form the curve will depend upon the task being performed by the slave unit. The approximating curve $\phi_n(\theta)$ is then transmitted to operator means 56.

Note that the desired value of $\bar{R}$ is known and for the purposes of explanation, is assumed to be a maximum, although the system could be operated with $\bar{R}$ being provided to be a minimum or any other specified value. Using the approximating curve $\phi_n(\theta)$ a cumulative distribution curve is formed by operating upon the curve $\phi_n(\theta)$ by a selected operator $\psi$. The operator $\psi$ could be any one of a number of operators to provide a cumulative distribution curve relative to the known value of $\bar{R}$. By a simple transposition the distribution curve can be transformed into a relationship of random numbers $p$ versus $\theta$. Note that with the transformed curve, portions of the curve will be skewed to provide greater emphasis or weight to the values of $\theta$ related to those skewed portions; in other words, assuming that the random numbers $p$ are selected in accordance with a Monte Carlo system where each number has an equal probability of occurring, the probability of obtaining a value of $\theta$ from one of the skewed or weighted portions is increased in accordance with the degree of skewing or weighting. A more detailed explanation of the above is given below.

A cumulative distribution curve $P_n(\theta)$ is formed for each value of $n$, by operating upon the curve $\phi_n(\theta)$ with a selected operator $\psi$, in accordance with the relation:

$$P_n(\theta) = \psi[\phi_n(\theta)]$$

This function gives the probability that the desired response $\bar{R}$ will occur for some value or values $\bar{\theta}$ in the interval $0 \leq \bar{\theta} < \theta$. Thus, $P_n(2\pi) = 1$ and the probability that $\bar{\theta}$ will occur in the interval $\theta_a \leq \bar{\theta} < \theta_b$ is $P_n(\theta_b) - P_n(\theta_a)$.

The operator $\psi$ could be any one of a class of operators $\{\psi\}$, and might be chosen from this class to provide cumulative distributions depending upon various factors such as the pattern to be recognized, the required rate of convergence, the accuracy of approximation, the value of $\bar{R}$, the characteristics of the circuitry required to implement the device, or other factors. Acceptable operators $\psi$ of the class $\{\psi\}$ are defined by the characteristic that, as $n$ increases, the probability is increased of selecting the next trial value $\theta^*$ near to a value which generates the desired response $\bar{R}$ from the slave mechanism. Stated differently, let S denote the set of values $\{\bar{\theta}\}$ for which the desired response $\bar{R}$ of the slave will occur. Let this set S be covered by a finite set of intervals $I_t \equiv (\theta_{ta} \theta_{tb})$ ($t=1, 2, \ldots T$) or $I_t \equiv (\theta_{ta} \leq \theta < \theta_{tb})$ so that $$S \subseteq I_1 U I_2 U \ldots U I_T$$

where $\subseteq$ denotes containment of the sets, and U denotes set theoretic union. Then for *every* such covering, $\psi$ must have the property that:

$$\lim_{n \to \infty} \sum_{t=1}^{T} \{\psi[\phi(\theta_{tb})] - \psi[\phi(\theta_{ta})]\} =$$

$$\lim_{n \to \infty} \sum_{t=1}^{T} [P_n(\theta_{tb}) - P_n(\theta_{ta})] = 1$$

Graphically, this property may be illustrated by the curves of FIGURES 4 and 5. The solid line curve of FIGURE 4 represents the true behavior of the slave as a function of $\theta$, with a maximum $\bar{R}$ occurring for the value $\bar{\theta}$. The dotted curves represent a number of approximations to $R = R(\theta)$ which are the curves $\phi_n(\theta)$, with $R = R(\theta)$ representing the true but initially unknown relationship between response signal and control signal. The curve of FIGURE 5 plots $P_n(\theta)$ as dotted lines converging to the step function which has the step occurring at $\bar{\theta}$ with $p$ being random numbers selected over an interval from zero to one.

A random number generator means 62 is utilized to select the next number $p$ in accordance with a Monte Carlo system whereby the probability of the occurrence of any random number $p$ is equal. The selection of $\theta^*$ satisfies the relation $p = P(\theta^*)$ with the $n$th selection of $\theta^*$ satisfying $p_n = P_n(\theta^*)$.

The new $\theta^*$ is then fed into the control means 44 and the cycle is repeated. As new values of $R^*$ are received they, and the corresponding $\theta^*$ values, are recorded in the memory means 52. As previously noted a number of such values up to $m$ are retained and at the selection of the $m+1$ value the first selection is discarded; hence the memory means 52, after the initial $m$ selections, will always be operating upon the same number of trials. As the values of $R^*$ approach the desired value $\bar{R}$, the trials will then converge quite rapidly as the desired result is attained, i.e., the recognition of the workpiece 12. This can be seen from the curves of FIGURES 4 and 5. In FIGURE 4 the first approximation curve $\phi_1$, will provide a cumulative distribution $P_1$ in FIGURE 5. Note that with distribution $P_1$ the probability of a selection of $\theta$ from a random number $p$ in the area proximate to the desired $\bar{\theta}$ is better than the selection of $\theta$ from areas proximate to the values $\theta = 0$ or $\theta = 2\pi$. As can be seen from FIGURES 4 and 5 the probability of selecting the desired $\bar{\theta}$ is improved with each of the successive distribution curves $P_2$ and $P_3$ corresponding to curves $\phi_2$ and $\phi_3$.

At the point of matching and occurrence of response signal $\bar{R}$ the logic circuit means 58 will provide an affirmative signal and the operation of the device will be stopped and the workpiece 12 removed; the conveyor 10 will be restarted and the process repeated.

Note that it is possible for some applications, that the curve of the response signal would be a function, which could in all likelihood have one peak near the value $\bar{R}$ and another peak elsewhere being less than $\bar{R}$. Here it would be possible to weight the probability of selecting the value of $\theta$ such that initially the probability of approaching the smaller peak would be increased. However, note that, because of the random means of selecting $\theta^*$, values will eventually be provided in the other portion of the curve; because of the continuous reshuffling of information and discarding of information in the memory storage means 52, eventually the values of the desired portion of the curve will predominate and the selection will converge rapidly upon the proper value of $\theta^*$. The system then in essence is self-corrective and self-adaptive to provide the desired result. In the system shown, in the event that a workpiece different from workpiece 12, such as workpiece 12a, were present at the work station, after a certain number of trials, assuming that $\bar{R}$ had not been attained, a timing or counter means in the logic circuit means 58 would interrupt the cycle and the conveying system will be restarted and a new part brought before the camera 14. This would be an indication that the workpiece before the camera 14 did not belong to that particular work station and it would be conveyed to the next station.

The specific details of the various means described in the computer 40 do not constitute a part of the present invention and are known to those skilled in the art and have been omitted for purposes of clarity.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplish the desired result and with the response signal having a determinable magnitude corresponding to the slave mechanism accomplishing the desired result, said system comprising: memory means for storing information including a selected number of selected values of the control signal and the corresponding values of the response signal, operating means for operating upon the information stored in said memory means for randomly selecting a new value of control signal from a distribution of selectable values of the control signal, means for randomly selecting said new value of the control signal from said distribution with said distribution being weighted in favor of values of the control signal proximate to those values of the control signal in said memory means having corresponding response signals with a magnitude most proximate to the determinable magnitude to provide a greater probability of selecting said new value of the control signal to provide the response signal of the determinable magnitude.

2. A self-adaptive control for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplish the desired result and with the response signal having a determinable magnitude corresponding to the slave mechanism accomplishing the desired result; said system comprising: memory means for storing information including a selected number of selected values of the control signal and the corresponding values of the response signal, said memory means including means for substituting the latest value of control signal and corresponding value of response signal for the oldest control signal and corresponding response signal after said selected number has been stored, operating means for operating upon the information stored in said memory means for randomly selecting a new value of control signal from a distribution of selectable values of the control signal, means for randomly selecting said new value of the control signal from said distribution with said distribution being weighted in favor of values of the control signal proximate to those values of the control signal in said memory means having corresponding response signals with a magnitude most proximate to the determinable magnitude to provide a greater probability of selecting said new value of the control signal to provide the response signal of the determinable magnitude.

3. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplishing the desired result and with the response signal having a determinable magnitude corresponding to the slave mechanism accomplishing the desired result; said system comprising: memory means for storing information including a selected number of selected values of the control signal and the corresponding values of the response signal, operating means for operating upon the information stored in said memory means for providing from the stored values of the response signal a cumulative distribution curve of control signals and random numbers with said cumulative distribution curve being weighted in favor of values of the control signal proximate to those values of the control signal in said memory means having corresponding response signals with a magnitude most proximate at the determinable magnitude to provide a greater probability of selecting said new value of the control signal to provide the response signal of the determinable magnitude, and random number generator means for randomly selecting a new one of said random numbers and from said new one the corresponding value of control signal from said cumulative distribution curve whereby said new value of the control signal is selected.

4. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplishing the desired result and with the response signal having a determinable magnitude corresponding to the slave mechanism accomplishing the desired result; said system comprising: memory means for storing information including a selected number of selected values of the control signal and the corresponding values of the response signal, said memory means including means for providing an approximating curve of the response signals versus the control signal stored in said memory means in order of increasing magnitude of control signal, operating means for operating upon said approximating curve for providing from the stored values of the response signal a cumulative distribution curve being a plot of random numbers uniformly distributed and control signals with said cumulative distribution curve being weighted in favor of values of the control signal proximate to those values of the control signal in said memory means having corresponding response signals with a magnitude most proximate to the determinable magnitude to provide a greater probability of selecting said new value of the control signal to provide the response signal of the determinable magnitude, and random number generator means for randomly selecting a new one of said random numbers and from said new one the corresponding value of control signal from said cumulative distribution curve whereby said new value of the control signal is selected.

5. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplishing the desired result and with the response signal having a determinable magnitude corresponding to the slave mechanism accomplishing the desired result; said system comprising: memory means for storing information including a selected number of selected values of the control signal and the corresponding values of the response signal, said memory means including means for providing an approximating curve of the response signals versus the control signals stored in said memory means in order of increasing magnitude of control signal, operating means for operating upon said approximating curve with a selected operator for providing from the stored values of the response signal a cumulative distribution curve being a plot of random numbers uniformly distributed and control signals with said cumulative distribution curve being weighted in favor of values of the control signal proximate to those values of the control signal in said memory means having corresponding response signals with a magnitude most proximate to the determinable magnitude to provide a greater probability of selecting said new value of the control signal to provide the response signal of the determinable magnitude, said selected operator having a characteristic described as follows:

$$\lim_{n \to \infty} \sum_{t=1}^{T} [\overline{P}_n(\theta_{tb}) - P_n(\theta_{ta})] = 1$$

in which:

$P_n(\theta)$ is said cumulative distribution curve for the $n$th trail of said system with $\theta$ representing the control signal, $P_n(\theta_{tb}) - P_n(\theta_{ta})$ is the probability taken from said cumulative distribution curve $P_n(\theta)$ that the determinable magnitude of the control signal will occur on said cumulative distribution curve in the interval $\theta_{ta} \leq \overline{\theta} < \theta_{tb}$, $\overline{\theta}$ is the value of the control signal for providing the response signal of determinable magnitude, $t$ consecutive integers being 1, 2 . . . T $a$, $b$ designates different values of $\theta_t$ and random number generator means for randomly selecting a new one of said random numbers and from said new one the corresponding value of control signal from said cumulative distribution curve whereby said new value of the control signal is selected.

6. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplishing the desired result and with the response signal having a determinable magnitude corresponding to the slave mechanism accomplishing the desired result; said system comprising: memory means for storing information including a selected number of selected values of the control signal and the corresponding values of the response signal, operating means for operating upon the information stored in said memory means for randomly selecting a new value of control signal from a distribution of selectable values of the control signal, means for randomly selecting said new value of the control signal from said distribution with said distribution being weighted in favor of values of the control signal proximate to those values of the control signal in said memory means having corresponding response signals with a magnitude most proximate to the determinable magnitude to provide a greater probability of selecting said new value of the control signal to provide the response signal of the determinable magnitude, and logic means for comparing the magnitudes of the response signals to the determinable magnitude and for providing an indication when a response signal has been obtained having a magnitude substantially equal to the determinable magnitude.

7. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplishing the desired result and with the response signal having a determinable magnitude corresponding to the slave mechanism accomplishing the desired result; said system comprising: memory means for storing information including a selected number of selected values of the control signal and the corresponding values of the response signal, operating means for operating upon the information stored in said memory means for randomly selecting a new value of control signal from a distribution of selectable values of the control signal, means for randomly selecting said new value of the control signal from said distribution with said distribution being weighted in favor of values of the control signal proximate to those values of the control signal in said memory means having corresponding response signals with a magnitude most proximate to the determinable magnitude to provide a greater probability of selecting said new value of the control signal to provide a response signal of the determinable magnitude, and logic means for comparing the magnitudes of the response signals to the determinable magnitude and for providing an indication when a response signal has been obtained having a magnitude substantially equal to the determinable magnitude, said logic means including timing means for interrupting the operation of said control system after a preselected interval.

8. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplishing the desired result and with the response signal having a known magnitude corresponding to the slave mechanism accomplishing the desired result; said system comprising: memory means for storing information including a selected number of selected values of the control signal and the corresponding values of the response signal, said memory means including means for substituting the latest value of control signal and corresponding value of response signal for the oldest control signal and corresponding response signal after said selected member has been stored, said memory means including means for providing an approximating curve of the response signals versus the control signals stored in said memory means in order of increasing magnitude of control signal, operating means for operating upon said approximating curve for providing from the stored values of the response signal a cumulative distribution curve being a plot of random numbers uniformly distributed and control signals with said cumulative distribution curve being weighted in favor of values of the control signal proximate to those values of the control signal in said memory means having corresponding response signals with a magnitude most proximate to the known magnitude to provide a greater probability of selecting said new value of the control signal to provide the response signal of the known magnitude, and random number generator means for randomly selecting a new one of said random numbers and from said new one the corresponding value of control signal from said cumulative distribution curve whereby said new value of the control signal is selected.

9. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplishing the desired result and with the response signal having a known maximum magnitude corresponding to the slave mechanism accomplishing the desired result; said system comprising: memory means for storing information including a selected number of selected values of the control signal and the corresponding values of the response signal, said memory means including means for substituting the latest value of control signal and corresponding value of response signal for the oldest control signal and corresponding response signal after said selecting number has been stored, said memory means including means for providing an approximating curve of the response signals versus the control signals stored in said memory means in order of increasing magnitude of control signal, operating means for operating upon said approximating curve with a selected operator for providing from the stored values of the response signal a cumulative distribution curve being a plot of random numbers uniformly distributed and control signals with said cumulative distribution curve being weighted in favor of values of the control signal proximate to those values of the control signal in said memory means having corresponding response signals with a magnitude the most proximate to the known maximum magnitude to provide a greater probability of selecting said new value of the control signal to provide the response signal of the known maximum magnitude, said selected operator having a characteristic described as follows:

$$\lim_{n \to \infty} \sum_{t=1}^{T} [P_n(\theta_{tb}) - P_n(\theta_{ta})] = 1$$

in which:

$P_n(\theta)$ is said cumulative distribution curve for the $n$th trial of said system with $\theta$ representing the control signal, $P_n(\theta_{tb}) - P_n(\theta)_{ta})$ is the probability taken from said cumulative distribution curve $P_n(\theta)$ that the known maximum magnitude of the control signal will occur on said cumulative distribution curve in the interval $\theta_{ta} \leq \bar{\theta} < \theta_{tb}$, $\bar{\theta}$ is the value of the control signal for providing the response signal of known maximum magnitude, $t$ consecutive integers being 1, 2 . . . T.

$a, b$ designates different values of $\theta_t$ and random number generator means for randomly selecting a new one of said random numbers and from said new one the corresponding value of control signal from said cumulative distribution curve whereby said new value of the control signal is selected.

10. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplishing the desired result and with the response signal having a known maximum magnitude corresponding to the slave mechanism accomplishing the desired result; said system comprising: memory means for storing information including a selected number of selected values of the control signal and the corresponding values of the response signal, said memory means including means for substituting the latest value of control signal and corresponding value of response signal for the oldest control signal and corresponding response signal after said selected number has been stored, said memory means including means for providing an approximating curve of the response signals versus the control signals stored in said memory means in order of increasing magnitude of control signal, operating means for operating upon said approximating curve with a selected operator for providing from the stored values of the response signal a cumulative distribution curve being a plot of random numbers uniformly distributed and control signals with said cumulative distribution curve being weighted in favor of values of the control signal proximate to those values of the control signal in said memory means having corresponding response signals with a magnitude the most proximate to the known maximum magnitude to provide a greater probability of selecting said new value of the control signal to provide the response signal of the known maximum magnitude, said selected operator having a characteristic described as follows:

$$\lim_{n\to\infty} \sum_{t=1}^{T} \{\psi[\phi(\theta_{tb})] - \psi[\phi(\theta_{ta})]\} =$$

$$\lim_{n\to\infty} \sum_{t=1}^{T} [P_n(\theta_{tb}) - P_n(\theta_{ta})] = 1$$

in which:

$\phi_n(\theta)$ is an approximation curve of the stored values of $\theta$ and corresponding values of said response signal in order of increasing argument $\theta$, $\psi[\phi_n(\theta)]$ is an operator selected to operate on the approximation curve $\phi_n(\theta)$ to provide a weighted distribution curve $P_n(\theta)$, $P_n(\theta)$ is said cumulative distribution curve for the $n$th trial of said system with $\theta$ representing the control signal, $P_n(\theta_{tb}) - P_n(\theta_{ta})$ is the probability taken from said cumulative distribution curve $P_n(\theta)$ that the known maximum magnitude of the control signal will occur on said cumulative distribution curve in the interval $\theta_{ta} \leq \bar{\theta} < \theta_{tb}$, $\bar{\theta}$ is the value of the control signal for providing the response signal of known maximum magnitude, $t$ consecutive integers being 1, 2, . . . T, $a, b$ designates different values of $\theta_t$, and random number generator means for randomly selecting a new one of said random numbers and from said new one the corresponding value of control signal from said cumulative distribution curve whereby said new value of the control signal is selected, and logic means for comparing the magnitudes of the response signals to the known maximum magnitude and for providing an indication when a response signal has been obtained having a magnitude substantially equal to the known maximum magnitude.

11. A self-adaptive control system for controlling a slave mechanism for accomplishing a desired result with the effort of the slave mechanism to accomplish the desired result being controlled by a control signal and with the slave mechanism providing a response signal having a magnitude varying in accordance with the proximity of the effort of the slave mechanism to accomplishing the desired result and with the response signal having a known maximum magnitude corresponding to the slave mechanism accomplishing the desired result; said system comprising: memory means for storing information including a selected number of selected values of the control signal and the corresponding values of the response signal, said memory means including means for substituting the latest value of control signal and corresponding value of response signal for the oldest control signal and corresponding response signal after said selected number has been stored, said memory means including means for providing an approximating curve of the response signals versus the control signals stored in said memory means in order of increasing magnitude of control signal, operating means for operating upon said approximating curve with a selected operator for providing from the stored values of the response signal a cumulative distribution curve being a plot of random numbers uniformly distributed and control signals with said cumulative distribution curve being weighted in favor of values of the control signal proximate to those values of the control signal in said memory means having corresponding response signals with a magnitude the most proximate to the known maximum magnitude to provide a greater probability of selecting said new value of the control signal to provide the response signal of the known maximum magnitude, said selected operator having a characteristic described as follows:

$$\lim_{n\to\infty} \sum_{t=1}^{T} \{\psi[\phi(\theta_{tb})] - \psi[\phi(\theta_{ta})]\} =$$

$$\lim_{n\to\infty} \sum_{t=1}^{T} [P_n(\theta_{tb})] - P_n(\theta_{ta})] = 1$$

in which:

$\phi_n(\theta)$ is an approximation curve of the stored values of $\theta$ and corresponding values of said response signal in order of increasing argument $\theta$, $\psi[\phi_n(\theta)]$ is an operator selected to operate on the approximation curve $\phi_n(\theta)$ to provide a weighted distribution curve $P_n(\theta)$, $P_n(\theta)$ is said cumulative distribution curve for the $n$th trial of said system with $\theta$ representing the control signal, $P_n(\theta_{tb}) - P_n(\theta_{ta})$ is the probability taken from said cumulative distribution curve $P_n(\theta)$ that the known maximum magnitude of the control signal will occur on said cumulative distribution curve in the interval $\theta_{ta} \leq \bar{\theta} < \theta_{tb}$, $\bar{\theta}$ is the value of the control signal for providing the response signal of known maximum magnitude, $t$ consecutive integers being 1, 2 . . . T, $a, b$ designates different values of $\theta_t$, and random number generator means for randomly selecting a new one of said random numbers and from said new one the corresponding value of control signal from said cumulative distribution curve whereby said new value of the control signal is selected, and logic means for comparing the magnitudes of the response signals to the known maximum magnitude and for providing an indication when a response signal has been obtained having a magnitude substantially equal to the known maximum magnitude, said logic means including timing means for interrupting the operation of said control system after a preselected interval.

No references cited.

ROBERT C. BAILEY, *Primary Examiner.*

R. ZACHE, *Assistant Examiner.*

UNITED STATES PATENT OFFICE
CERTIFICATE OF CORRECTION

Patent No. 3,331,059            July 11, 1967

Harold Willis Milnes

It is hereby certified that error appears in the above numbered patent requiring correction and that the said Letters Patent should read as corrected below.

Column 3, line 54, for "$\theta$", first occurrence, read -- $\phi$ --; column 5, line 17, for "..." read -- --- --; line 64, for "O" read -- 0 --; column 6, line 62, for "control" read -- control system --; column 7, line 18, for "at" read -- to --.

Signed and sealed this 11th day of June 1968.

(SEAL)
Attest:

Edward M. Fletcher, Jr.            EDWARD J. BRENNER

Attesting Officer                    Commissioner of Patents